United States Patent [19]

Korkala

[11] Patent Number: 5,592,051
[45] Date of Patent: Jan. 7, 1997

[54] INTELLIGENT LAMP OR INTELLIGENT CONTACT TERMINAL FOR A LAMP

[76] Inventor: Heikki Korkala, Juurikastie 22, Oulunsalo, Finland, SF-90460

[21] Appl. No.: 524,119

[22] Filed: Aug. 24, 1995

Related U.S. Application Data

[63] Continuation of Ser. No. 244,059, filed as PCT/FI92/00304, Nov. 10, 1992, abandoned.

[30] Foreign Application Priority Data

Nov. 13, 1991 [FI] Finland .................................. 915346

[51] Int. Cl.⁶ .................................................. H05B 37/02
[52] U.S. Cl. .......................... 315/210; 315/291; 315/292; 315/307; 315/316
[58] Field of Search ................................ 315/209 R, 210, 315/291, 292, 307, 308, 316

[56] References Cited

U.S. PATENT DOCUMENTS

| 4,156,151 | 5/1979 | Borroni ............................... 307/10 R |
| 4,222,047 | 9/1980 | Finnegan ................................ 315/135 |
| 4,283,636 | 8/1981 | Tchang ..................................... 307/38 |
| 4,370,600 | 1/1983 | Zansky ................................... 315/291 |
| 4,396,872 | 8/1983 | Nutter ..................................... 315/308 |
| 4,733,138 | 3/1988 | Pearlman et al. ....................... 315/316 |
| 4,780,620 | 10/1988 | Högberg et al. ........................... 307/10 |
| 4,965,492 | 10/1990 | Boldwyn ................................. 315/308 |
| 4,999,547 | 3/1991 | Ottenstein .............................. 315/308 |
| 5,142,203 | 8/1992 | Oda et al. ........................... 315/DIG. 7 |

FOREIGN PATENT DOCUMENTS

| 0217762 | 4/1987 | European Pat. Off. . |
| 0430792 | 6/1991 | European Pat. Off. . |
| 3041896 | 6/1982 | Germany . |

Primary Examiner—Robert Pascal
Assistant Examiner—Darius Gambino
Attorney, Agent, or Firm—Michael D. Bednarek; Kilpatrick & Cody

[57] ABSTRACT

The invention relates to an intelligent lamp or an intelligent contact terminal for a lamp, which can be used in a lighting system comprising a plurality of individually controlled lamps linked in a common power-supply circuit and an operation control device for transmitting a desired operation control signal to electronic control elements, associated with the lamp or the contact terminal and reacting or failing to react selectively to various control signals. Together with the lamp or its contact terminal, said electronic control elements provide a single replaceable component which, on the basis of a message included in the operation control signal, identifies itself to serve as an appropriate lamp. In addition, the electronic control elements monitor the condition of itself and that of the lamp and, if necessary, produce a fault indication.

17 Claims, 5 Drawing Sheets 5,592,051

INTELLIGENT LAMP OR INTELLIGENT CONTACT TERMINAL FOR A LAMP

This application is a continuation of application Ser. No. 08/244,059 filed as PCT/FI92/00304 Nov. 10, 1992, now abandoned.

BACKGROUND OF THE INVENTION

The present invention relates to an intelligent lamp or an intelligent contact terminal for a lamp for use is a lighting system, comprising a plurality of individually controlled lamps linked in one and the same power-supply circuit and an operation control device for transmitting a desired operation control signal to electronics control elements which are included in the lamp or the contact terminal and which selectively react or fail to react to various control signals.

The above type of lighting systems have been earlier proposed e.g. in European Patent publications EP-0 217 762 and EP-0 430 792. This type of lighting system is particularly suitable for use as an automotive lighting system, an essential benefit gained over the traditional systems being that all lamps can be connected in a conductor series, including e.g. two or three conductors. The system will be more simple and inexpensive as the number of conductors is substantially reduced. The number of connections is also reduced. In these prior known lighting control systems, however, the lamp or its contact terminal is not provided with electronics facilitating the independent "intelligent" operation thereof for fully exploiting the benefits of the system.

SUMMARY OF THE INVENTION

An object of the invention is to provide a new type of intelligent lamp or an intelligent contact terminal for a lamp, comprising a replaceable standard component which nevertheless includes a sufficient amount of operational intelligence for bringing the entire system with its variety of differently operating lamps into a condition more standardized than before.

In order to achieve this object, an intelligent lamp of the invention is characterized in that said electronic control elements and the lamp provide a single replaceable component fitted with means for identifying a predetermined message included in the control signal and with means for switching on the lamp upon the identification of said predetermined message.

In a preferred embodiment of the invention, the electronic control elements further include means for monitoring the operating condition of the lamp and means for producing a fault indication if a current passing through the lamp is higher or lower than a predetermined maximum or minimum value.

Alternatively, the object of the invention is also achieved by means of an intelligent contact terminal which is characterized in that said electronic control elements and the contact terminal provide a single replaceable component fitted with means for identifying a predetermined message included in the control signal, means for switching on the lamp upon the identification said predetermined message, means for monitoring the operating condition of the lamp and means for producing a fault indication if a current passing through the lamp is higher or lower than a predetermined maximum or minimum value.

BRIEF DESCRIPTION OF THE DRAWINGS

A few exemplary embodiments of the invention will now be described in more detail with reference made to the accompanying drawings, in which.

DETAILED DESCRIPTION OF THE PREFERRED EMBODIMENTS

Figure 1:
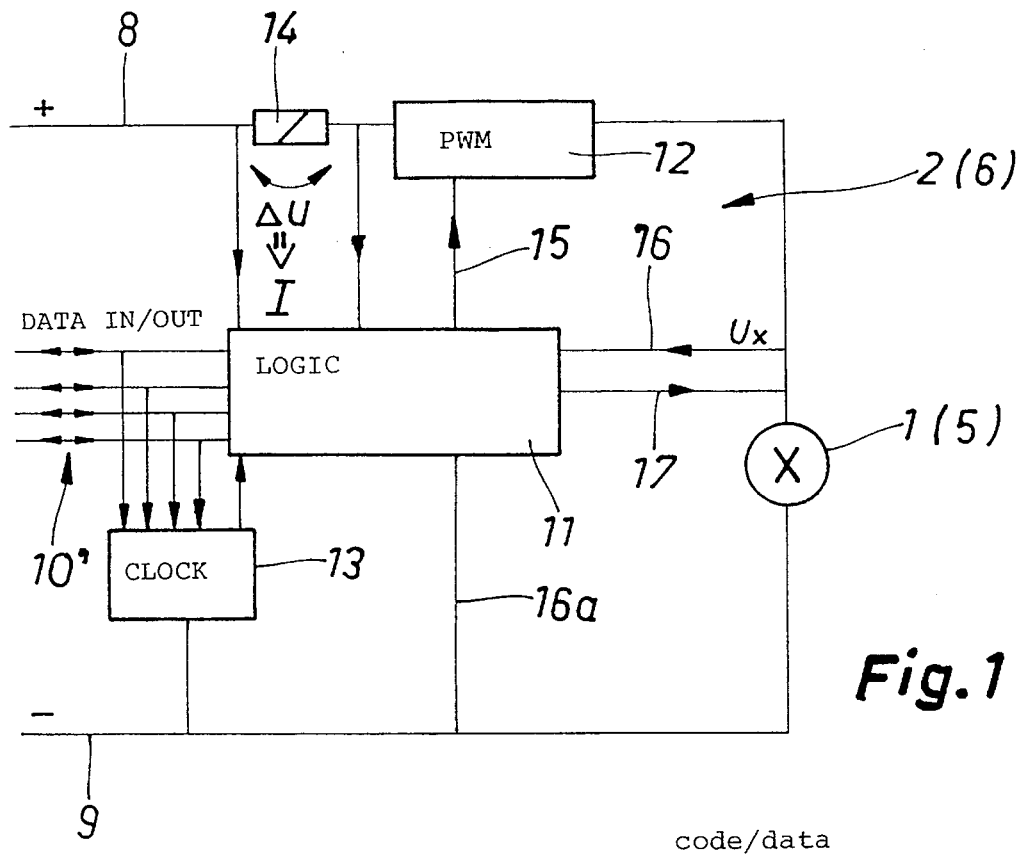
FIG. 1 shows a block diagram as an example of an electric circuit for embodying an intelligent lamp or contact terminal.
Figure 2:
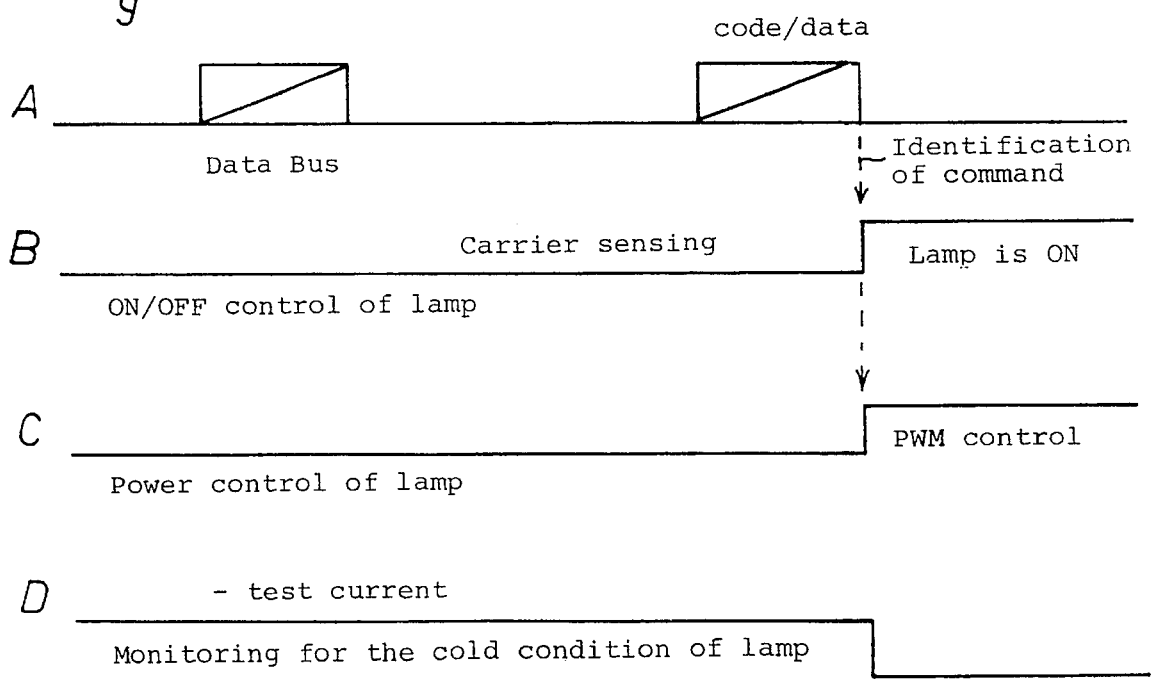
FIG. 2 illustrates various control and operating conditions A-D for an intelligent lamp or a contact terminal.

FIG. 1 shows an example of the electric circuit for an intelligent lamp or an intelligent terminal. A lamp 1 is connected to a power-supply circuit provided between conductors 8 and 9. Connected in series with lamp 1 is a fuse 14 and a pulse-width modulator 12. A logic circuit 11 effects the operation control, as described in more detail hereinafter. The logic circuit 11 is provided with a data path 10' for giving operation control commands by means of an external control device (e.g. switches 21 and a control device 20 designed by the application of hybrid technique in FIG. 9). In addition, between data path 10' and logic circuit 11 is located a synchronizing clock 13, which identifies the clock frequency from a data path control command. The operation of circuit components shown in FIG. 1 is illustrated in more detail in FIG. 2. The logic circuit 11 monitors the data path messages, which in the present case are codes in the form of data. When the logic circuit 11 identifies a predetermined code, intended for switching on lamp 1, it delivers an instruction through a wire 15 to activate said pulse-width modulator 12. An essential feature is that, on the basis of a received message, the logic circuit 11 identifies lamp 1 to make the latter operate as an appropriate lamp and, if necessary, performs automatically e.g. the following actions: power control, flashing action, dusk switching etc. For power control, the logic circuit measures a voltage difference $\Delta u$ across fuse 14. On the basis of this measured result, the logic circuit 11 has knowledge of a current I running through lamp 1. By means of a conductor 16 the logic circuit measures a voltage Ux acting across lamp 1 and measures the power Ux•I. On the basis of this measuring and calculating operation, said logic circuit 11 controls pulse-width modulator 12 so as to provide lamp 1 with a predetermined power, which corresponds to the action intended for this particular lamp.

There is also provided a monitoring system for the cold condition of lamp 1. For this purpose, a very low test current passes by way of logic circuit 11 and a conductor 17 through lamp 1. If the test current is >0 or <a predetermined value, the lamp is in order. If the test current is zero or higher than a predetermined value, said logic circuit 11 delivers a fault indication e.g. through the same data path 10' that it uses for receiving an operation control command.

The lamp condition can also be monitored during the active period of a lamp: if a current I passing through the lamp is higher or lower than a predetermined maximum or minimum value, the logic circuit 11 produces a fault indication.

Figure 3:
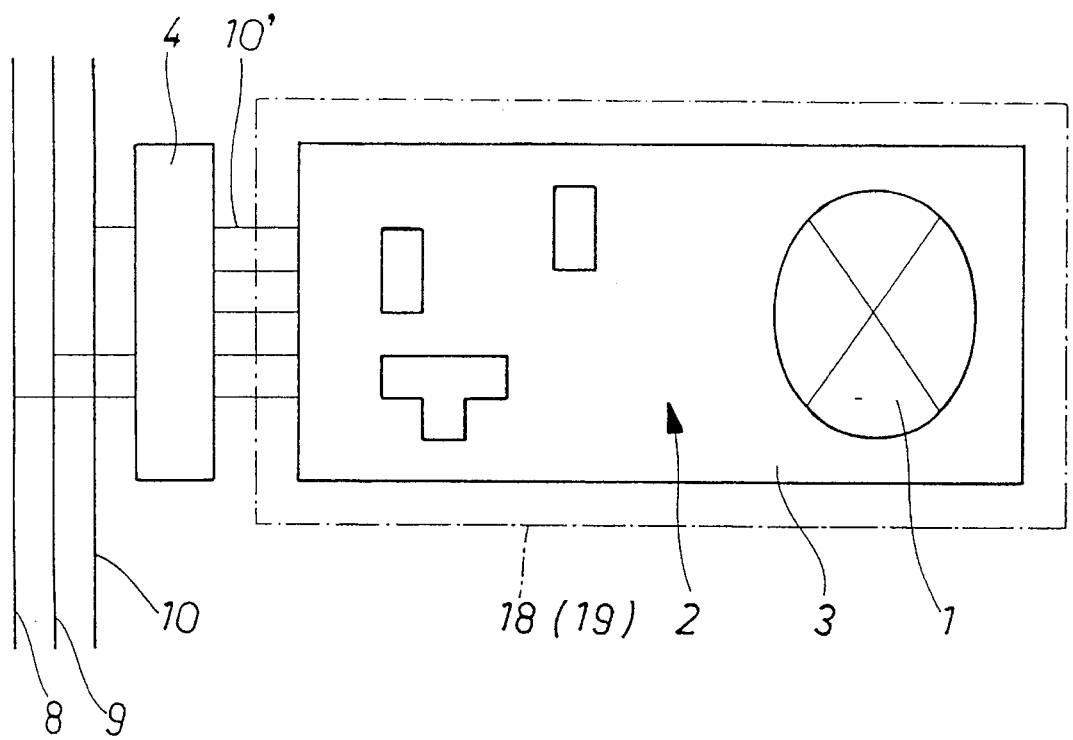
FIG. 3 illustrates the principle of an intelligent lamp.

In FIG. 1, the electronic control elements of lamp 1 are generally designated with reference numeral 2. FIG. 3 illustrates the principle of an intelligent lamp, wherein lamp 1 and electronic control elements 2 make up a single component which can be designed as a module by using e.g. a sizing, soldering and/or filament-bonding technique. Contacting the above-mentioned elements is preferably effected e.g. on a ceramic base or a pcb-card 3. A part of the electronics, such as wiring and resistances, can be printed by a thick-film technique on ceramic base 3. Alternatively, the resistances can be printed e.g. by a polymer-printing technique on a pcb-card. The thick-film hybrid technique can be used for manufacturing a sufficiently small-size and inexpensive component, which is an entirely replaceable and disposable part.

Figure 5:
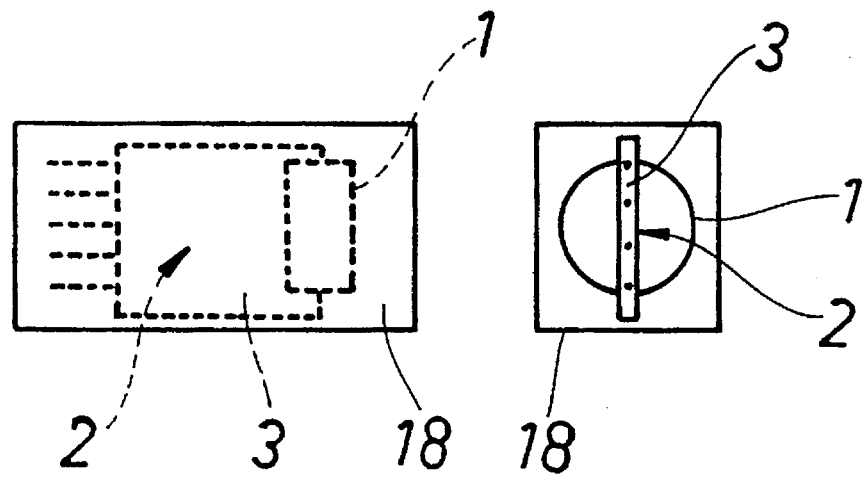
FIGS. 5 and 6 show examples of various designs for an intelligent lamp.
Figure 6:
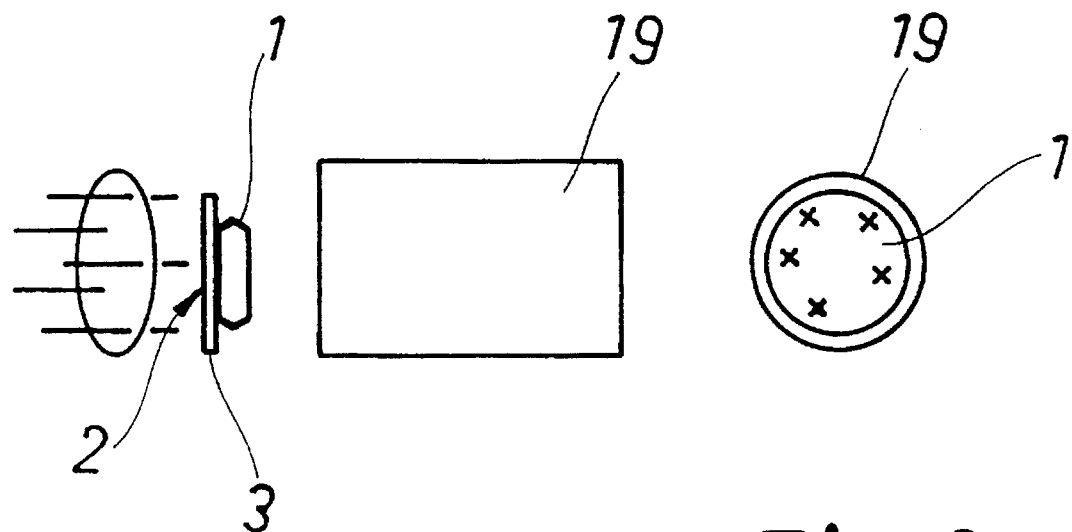

FIGS. 5 and 6 illustrate exemplary designs for an intelligent lamp 1, 2, 3. In both exemplary designs, the electronic control elements 2 and lamp 1 are integrated as a single component on a card 3. In the case of FIG. 5, a tubular housing 18 having a square cross-section is provided with a card or a printed-circuit board 3 extending lengthwise of the housing. In the case of FIG. 6, a tubular housing 19 having a circular cross-section is provided with a circular printed-circuit board 3 extending transversely of the housing. In each case, the printed-circuit board 3 carries a sufficient number of contact studs which provide data path 10' and connections to current conductors 8 and 9.

The transmission of operation control data is preferably effected by using a serial path, which only requires one signal conductor 10. As shown in FIG. 3, between conductor series 8, 9, 10 and intelligent lamp component 1, 2, 3 is then required a contact 4, which serves as a coder between serial path conduit 10 and parallel data path 10'. If the control is effected e.g. at an RF-frequency, no signal conductor 10 is required for the control.

Figure 4:
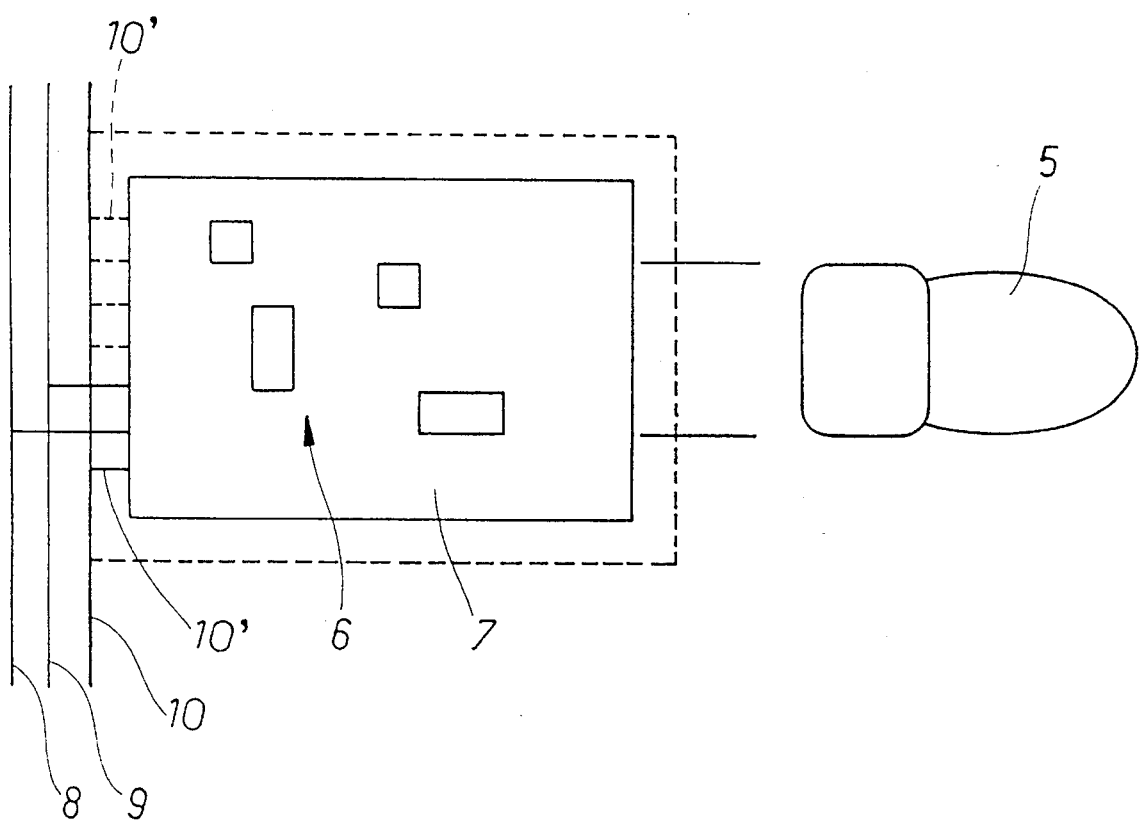
FIG. 4 illustrates the principle of an intelligent contact terminal.

An intelligent contact terminal shown in FIG. 4 corresponds in its operating principle to the above-described intelligent lamp. Electronic control elements 6 are mounted on a ceramic base or a printed-circuit board 7. A lamp 5 can be e.g. a conventional lamp currently used in an automobile and it can be attached to component 6, 7 in a manner similar to the current method of attachment. Thus, no modifications are required in the manufacturing technique of lamp 5 and its socket shell. In this sense, the only difference from a traditional system is that just a single type of lamps 5 are needed. In the case of FIG. 4, the coder of data received from serial path 10 is connected to electronic control elements 6. An additional coding can be effected by linking one or more of the conductors of data path 10' to serial path conduit 10 or current-supply conductors 8 or 9.

Figure 7:
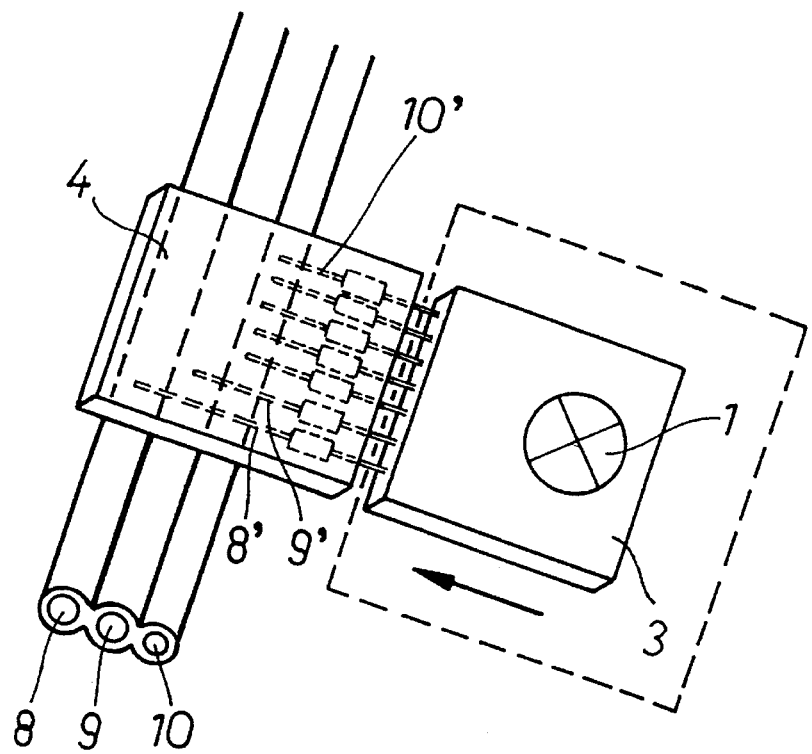
FIGS. 7 and 8 illustrate schematically the connection an intelligent lamp and contact terminal with the conductor series of a lighting system.
Figure 8:
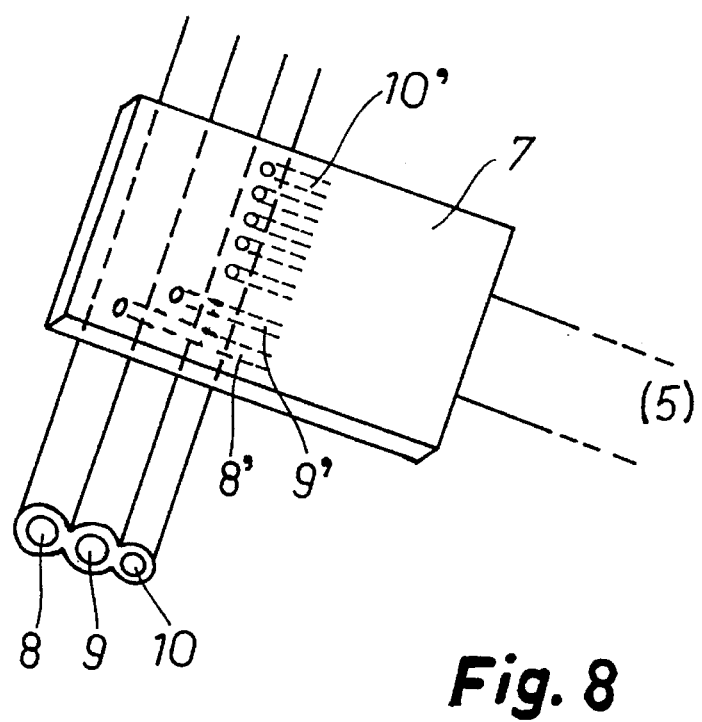

FIGS. 7 and 8 illustrate in more detail the connection of an intelligent lamp or an intelligent terminal to a conductor series, including a current conductor 8 and a signal conductor 10. The conductor series may also include a return-current conductor 9, which can nevertheless be replaced by the chassis of an automobile. A desired number of components of the invention can be connected in parallel in this conductor series. Connecting and simultaneously coding can be effected e.g. by means of a crimping technique by pressing connecting wires 8', 9' as well as an optional number of connecting wires 10' into the contact with conductors 8, 9 and 10 through a conductor insulation. Coding can be effected e.g. by contacting coding wires 10' with a signal conductor 10, an input current conductor 8 or an output current conductor 9. The coding associated with the selectability of connecting wires 10' can be used to define each lamp 1, 5 to serve, according to its location, as a blinker, a parking light, a reverse light, a taillight etc. Thus, this additional coding makes it easier for a component to identify itself so as to serve as an appropriate lamp on the basis of a received message. However, the identification and operation control can be entirely included in a message to be included, whereby the additional coding is not necessary. In the case of FIG. 7, even the lamp 1 can be an exposed component to be mounted on ceramic base 3. The intelligent lamp 1, 3 is a standard component, which by virtue of contact terminal 4 has been coded to serve as an appropriate lamp. In the case of FIG. 8, the connecting wires of an intelligent terminal 7 can be fitted with a normal lamp 5, the same way as shown in FIG. 4.

Figure 9:
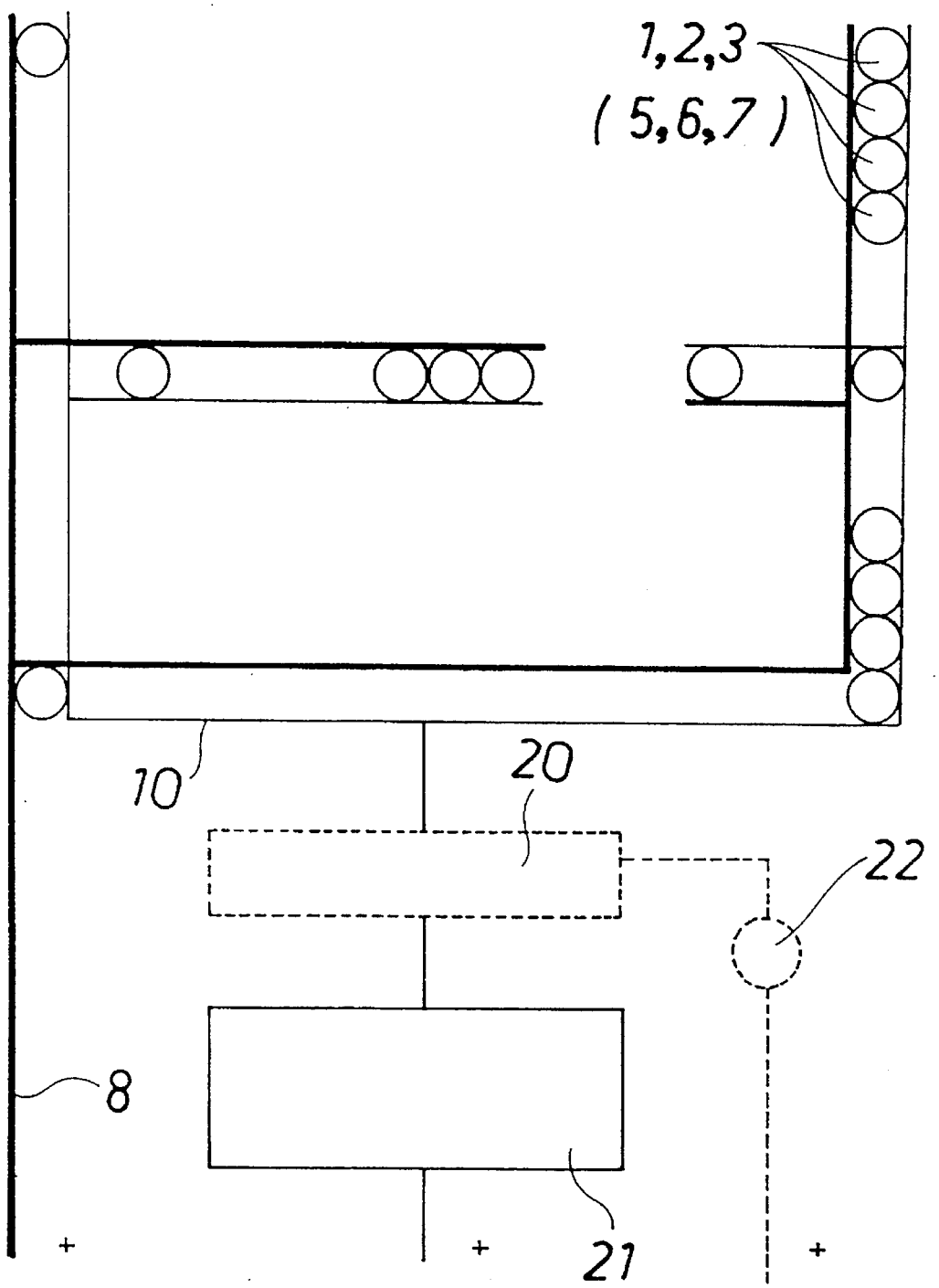
FIG. 9 shows a circuit diagram for an automotive lighting system capable of applying intelligent lamps or intelligent contact terminals of the invention.

FIG. 9 illustrates the use of intelligent lamps or intelligent terminals of the invention in an automotive lighting system. A conductor series including current conductor 8 and signal conductor 10 is fitted at appropriate points with a necessary number of intelligent lamps 1, 2, 3 or intelligent terminals 6, 7 along with their lamps 5. Messages from conventional switches 21 are converted in an electronic control device 20 into suitable serially formed control codes which can be identified by the appropriate intelligent lamp or intelligent terminal. The control device 20 can also be designed by using a thick-film hybrid technique. The automobile dashboard may also include one of a plurality of signal light devices 22 for giving a fault indication whenever any of the components 1, 2, 3 or 5, 6, 7 is out of order. A fault indication can be produced by using a signal wire 10.

It is obvious that the invention is not limited to the above-described exemplary embodiment. An essential feature in the invention is that the operation control electronics and the lamp provide a single component (intelligent lamp) or, alternatively, the electronics and the contact terminal provide a single component (intelligent terminal).

A component of the invention must satisfy the following requirements:

1. Identifying

The component itself identifies an incoming message, which can be e.g.:

a code using e.g. serial path RS 232, 12C- BUS or a serial path protocol intended for an automobile)

tone frequency

RF-frequency infrared radiation or light

2. Objectives

On the basis of a received message, the component must identify itself to serve as a proper lamp, effecting automatically, if necessary, e.g. the following actions:

power control blinker action dusk switching.

3. Self-control

The component protects itself from external interferences and switches off of the circuit (fuse 14) before causing damage to exterior electronics. The component also reports its out-of-order condition, using a message line which may be the same as or different from the one for receiving messages.

The number of the above factors, associated with the identification process of the component, its objectives or self-control, can be one or more depending on the intended application.

Mechanical dimensions of the component may vary within quite a wide range depending on the intended application. In practice, however, the purpose is to create a standard design for a particular application. For example, just one single design for automotive use etc.

The control of a component of the invention can also be effected by using control units operating on prior known principles. Such units may include e.g.

code transmitter infrared transmitter

RF-transmitter.

Since such control units are prior known in various contexts and since they are not included within the scope of patent protection defined by this application, such units shall not be described here in more detail.

I claim:

1. An intelligent filament lamp for use in a lighting system of a vehicle, comprising:

a plurality of individually controlled lamps linked in a common power-supply circuit, each of said lamps having their own associated electronic control elements;

a single common code conductor which is connected to each of said electronic control elements;

an operation control device for transmitting a desired operation control signal over said single common code conductor to the electronic control elements associated with each lamp, said elements selectively reacting or failing to react to various control signals;

wherein each lamp and electronic control element pair provides a single replaceable component which is fitted with means for identifying a predetermined message included in the control signal and with means for switching on the lamp upon identification of said predetermined message;

wherein said means for identifying comprises a logic circuit and a synchronizing clock;

wherein said means for switching comprises the logic circuit and a pulse-width modulator.

2. An intelligent lamp as set forth in claim 1, characterized in that said electronic control elements also include means for monitoring the operating condition of the lamp and means for giving a fault indication if the current passing through the lamp is higher or lower than a predetermined maximum or minimum value.

3. An intelligent lamp as set forth in claim 2, characterized in that said electronic control elements further include means for regulating the power passing through the lamp.

4. An intelligent lamp as set forth in claim 2, characterized in that the electronic components included in said electronic control elements are mounted by sizing, soldering and/or filament-bonding technique on a ceramic base, some of the electronics, such as wiring and resistances, being printed thereon by means of a thick-film technique, or on a pcb-board with resistances being printed thereon by a polymer-printing technique.

5. An intelligent lamp as set forth in claim 3, characterized in that said power-regulating means are adapted to receive their control on the basis of the measured values of a load current passing through the lamp and a voltage acting across the lamp.

6. An intelligent lamp as set forth in claim 2, characterized in that testing of the cold condition of the lamp is effected by conducting through the lamp a very low test current from an operation control logic, which delivers a fault indication if the test current is zero or higher than a predetermined value.

7. An intelligent lamp as set forth in claim 1, characterized in that said replaceable component or its separate contact terminal is connected with a conductor series including at least one current conductor by means of a crimping method through a conductor insulation.

8. An intelligent lamp as set forth in claim 1, characterized in that additional coding to the predetermined message is effected by means of optional contacts between said electronic control elements of said replaceable component and the common code conductor or a current conductor.

9. An intelligent contact terminal for a filament lamp for use in a lighting system of a vehicle, comprising:

a plurality of individually controlled replaceable lamps linked in a common power-supply circuit, each of said lamps having their own intelligent contact terminal and associated electronic control elements;

a single common code conductor which is connected to each of said electronic control elements;

an operation control device for transmitting a desired operation control signal over said single common code conductor to the electronic control elements associated with each contact terminal, said elements selectively reacting or failing to react to various control signals;

wherein each replaceable lamp has a single replaceable contact terminal with associated electronic control elements which are fitted with means for identifying a predetermined message included in the control signal, means for switching on the lamp upon identification of said predetermined message, means for monitoring the operating condition of the lamp and means for giving a fault indication if the current passing through the lamp is higher or lower than a predetermined maximum or minimum value;

wherein said means for identifying comprises a logic circuit and a synchronizing clock;

wherein said means for switching comprises the logic circuit and a pulse-width modulator.

10. An intelligent contact terminal for a filament lamp for use in a lighting system of a vehicle, comprising:

a plurality of individually controlled replaceable lamps linked in a common power-supply circuit, each of said lamps having their own intelligent contact terminal and associated electronic control elements;

a single common code conductor which is connected to each of said electronic control elements;

an operation control device for transmitting a desired operation control signal over said single common code conductor to the electronic control elements associated with each contact terminal, said elements selectively reacting or failing to react to various control signals;

wherein each replaceable lamp has a single replaceable contact terminal with associated electronic control elements which are fitted with means for identifying a predetermined message included in the control signal, means for switching on the lamp upon identification of said predetermined message and means for effecting optional contacts between said electronic control elements of said replaceable component and said common code conductor or a current conductor for coding different functions of the lamps according to their location;

wherein said means for identifying comprises a logic circuit and a synchronizing clock;

wherein said means for switching comprises the logic circuit and a pulse-width modulator.

11. An intelligent lamp as set forth in claim 9, characterized in that said electronic control elements further include means for regulating the power passing through the lamp.

12. An intelligent lamp as set forth in claim 9, characterized in that the electronic components included in said electronic control elements are mounted by sizing, soldering and/or filament-bonding technique on a ceramic base, some of the electronics, such as wiring and resistances, being printed thereon by means of a thick-film technique, or on a pcb-board with resistances being printed thereon by a polymer-printing technique.

13. An intelligent lamp as set forth in claim 11, characterized in that said power-regulating means are adapted to receive their control on the basis of the measured values of a load current passing through the lamp and a voltage acting across the lamp.

14. An intelligent lamp as set forth in claim 9, characterized in that testing of the cold condition of the lamp is effected by conducting through the lamp a very low test current from an operation control logic, which delivers a fault indication if the test current is zero or higher than a predetermined value.

15. An intelligent lamp as set forth in claim 9, characterized in that said replaceable lamp or its replacable contact terminal is connected with a conductor series including at least one current conductor by means of a crimping method through a conductor insulation.

16. An intelligent lamp as set forth in claim 9, characterized in that additional coding to the predetermined message is effected by means of optional contacts between said electronic control elements and the common code conductor or a current conductor.

17. An intelligent contact terminal for a filament lamp for use in a lighting system of a vehicle, comprising:

a plurality of individually controlled replaceable lamps linked in a common power-supply circuit having insulated conductors, each of said lamps being connected to an intelligent contact terminal and associated electronic control elements;

a single common code conductor which is connected to each of said electronic control elements;

an operation control device for transmitting a desired operation control signal over said single common code conductor to the electronic control elements associated with each contact terminal, said elements selectively reacting or failing to react to various control signals;

wherein each replaceable contact terminal has connecting wires pressed into contact with said conductors through the insulation thereof, said electronic control elements including means for identifying a predetermined message included in the control signal, means for switching on the lamp upon identification of said predetermined message, means for monitoring the operating condition of the lamp and means for giving a fault indication if the current passing through the lamp is higher or lower than a predetermined maximum or minimum value;

wherein said means for identifying comprises a logic circuit and a synchronizing clock;

wherein said means for switching comprises the logic circuit and a pulse-width modulator.

* * * * *